No. 738,820. PATENTED SEPT. 15, 1903.
V. LAPP.
CLOSED SURFACE COOLER CONNECTED WITH A SEDIMENT REMOVING DEVICE.
APPLICATION FILED MAY 25, 1901.
NO MODEL.
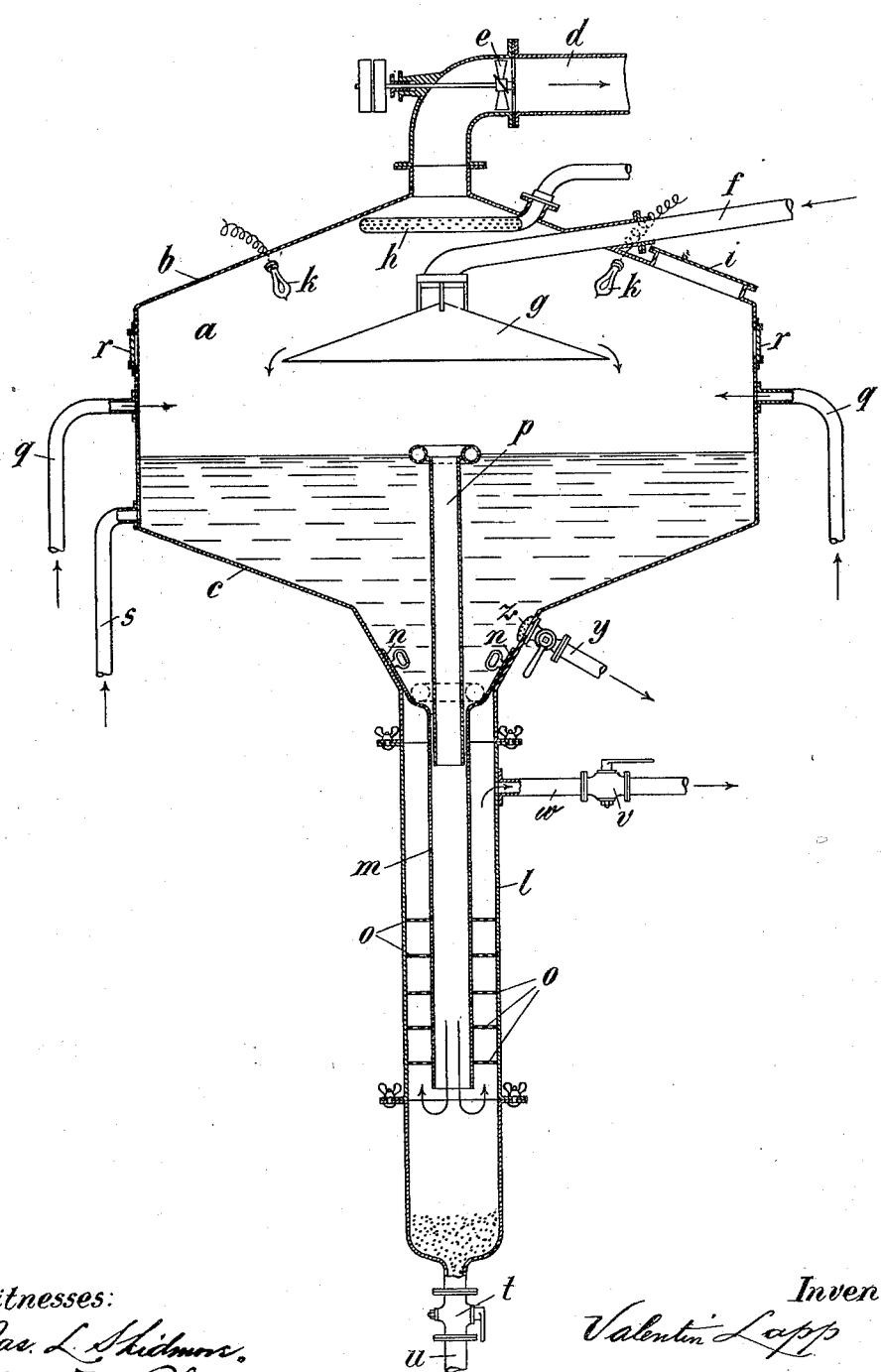
Witnesses:
Jas. L. Skidmore.
May M. Plyer.
Inventor:
Valentin Lapp
by B. Singer
his Attorney.

No. 738,820.

Patented September 15, 1903.

UNITED STATES PATENT OFFICE.

VALENTIN LAPP, OF LINDENAU, NEAR LEIPZIG, GERMANY.

CLOSED SURFACE COOLER CONNECTED WITH A SEDIMENT-REMOVING DEVICE.

SPECIFICATION forming part of Letters Patent No. 738,820, dated September 15, 1903.

Application filed May 25, 1901. Serial No. 61,887. (No model.)

*To all whom it may concern:*

Be it known that I, VALENTIN LAPP, brewer, a subject of the King of Saxony, residing at Lindenau, near Leipzig, in the Kingdom of Saxony, in the German Empire, have invented new and useful Improvements in Closed Surface Coolers Connected with Sediment-Removing Devices, of which the following is a specification.

The closed surface cooler forming the subject-matter of this invention is an improvement upon the open surface coolers hitherto employed in that the cooling of the beer by means of this improved cooler may be effected in a perfectly sterile manner and the precipitation of the sediments may be brought about quicker and more perfect and in that, further, the sediments are collected at one place, above which the beer may be drawn off directly or by a siphon.

A vertical section through my improved surface cooler is shown in the accompanying drawing, in which—

$a$ is a vessel of either circular or preferably rectangular or quadrangular shape. The vessel $a$ is closed by a cover or lid $b$, and the bottom $c$ of the vessel is, contrary to the usual practice, formed similar to a funnel. From the cover $b$ extends a steam-exhaust pipe $d$, containing an exhauster $e$, as well as a beer-supply pipe $f$, having a distributing-plate $g$. There is, further, a manhole $i$ and a spray $h$, and there may be provided means for lighting the interior of the vessel—for instance, glow-lamps—as well as fittings, such as thermometers and the like.

From the lowermost part of the funnel $c$ extends downward a cylinder $l$, the lowermost part of which serves for collecting the sediments and is preferably so arranged as to be removable from the other part. This latter contains a pipe $m$ for leading the sediments down into the cylinder $l$. The pipe $m$ is widened at its upper part and loosely hung with this part in the lower end of the funnel $c$, and said widened part is provided with handles $n$ for removing the pipe $m$ out of the cylinder $l$. The length of the pipe $m$ is such that its lower end is somewhat above the highest level of the collected sediments, and to effect a further clarification of the beer filtering-sieves $o$ are provided between the pipe $m$ and the cylinder $l$, said sieves being preferably fixed to said pipe, so as to be removable together with the same. The meshes of the lower sieves should be wider than those of the upper ones, so as to prevent the lower ones from being too soon obstructed. A floating pipe $p$ extends down into the upper end of the pipe $m$ and serves to lead always the upper part of the beer down into the cylinder $l$. The pipe $p$ is provided at its upper end with a suitable float 10, as shown, to hold the upper end of the pipe at its proper level relative to the surface of the beer. Pipes $q$, serving for leading filtered air into the vessel $a$, terminate in the latter shortly above the upper surface of the beer. The cooling is, however, effected in a sterile manner, and an excessive cooling is avoided, because the air cannot push upon the beer and penetrate into the same. Windows $r$ permit of watching the process, and a pipe $s$ permits of leading steam into the beer for sterilizing the same.

After the surface cooler has been cleansed and the air has been blown out of it by means of steam filtered air is let into the vessel $a$ through the pipes $q$, the exhauster $e$ is put in operation, and the wort to be cooled is introduced into the vessel by a pump or the like until it forms a layer of about the height shown in the drawing. The main portion of the sediment collects after a short time—say after fifteen minutes—upon the oblique bottom $c$ and glides down first into the pipe $m$ and then into the lower part of the cylinder $l$, wherein it collects. To allow of the sediment gliding down from the oblique bottom into the pipe $m$, a relatively small annular space is left between the adjacent sides of the pipes $m$ and $p$, the outer diameter of the latter being slightly smaller than the inner diameter of the pipe $m$. The annular space just described, which is provided by loosely mounting the pipe $p$ to permit of its readily moving vertically as required, while permitting of the passage of sediment, is not sufficient to pass the contents of the cylinder to any great extent, the main portion of the contents passing downward through the pipe $p$, which, as shown, has its upper surface or edge slightly below the surface of the beer. The small amount of sediment remaining upon the oblique bottom $c$ is finally led into the cylinder $l$ by means of the floating pipe $p$ when the last part of the beer is sucked off through said pipe. When the cock $v$ of the pipe $w$ is opened, the beer flows first down into the pipes $p$ and $m$ and then upward between the pipe $m$ and the cylinder $l$ through the sieves $o$. The beer leaves the pipe $w$ in a perfectly clear state, and the sediments are removed by opening a cock $t$ or the like of a pipe $u$.

Instead of drawing the beer off through the parts $p$, $m$, $l$, and $w$ it may be drawn off directly from the funnel-bottom $c$ by a pipe $y$, located, preferably, at the lowermost part of said bottom. The sediments collecting upon the latter glide very soon down into the cylinder $l$, especially if the pipe $m$ is removed, so that there is perfectly-clarified beer at the entrance to the pipe $y$, which, moreover, may be provided with a sieve $z$ or the like, retaining every particle of the sediments.

Having now described my invention, what I desire to secure by Letters Patent of the United States is—

1. In a combined closed surface cooler and sediment-collecting device, the combination with the cooler proper having a funnel-shaped bottom, a central aperture in the latter, and a downwardly-extending elongation of said bottom below said aperture, of a pipe $m$ removably suspended in said aperture and supported by the surrounding part of the bottom $c$, and extending down into said elongation $l$, the upper end of said pipe being flaring to fit the supporting part of the funnel-shaped bottom, and a pipe $w$ connected with the latter shortly below the said bottom, as set forth.

2. In a combined closed surface cooler and sediment-collecting device, the combination with the cooler proper having a funnel-shaped bottom, a central aperture in the latter, and a downwardly-extending elongation of said bottom below said aperture, of a pipe $m$ removably suspended in said aperture and supported by the surrounding part of the bottom $c$, and extending down into said elongation $l$, the upper end of said pipe being flaring to fit the supporting part of the funnel-shaped bottom, a pipe $w$ connected with the latter shortly below the said bottom, and sieves located one above the other between this pipe and the first-mentioned one $m$, said sieves extending each from said first pipe $m$ to the opposite wall of the said elongation $l$, as set forth.

3. In a combined closed surface cooler and sediment-collecting device, the combination with the cooler proper having a funnel-shaped bottom, a central aperture in the latter, and a downwardly-extending elongation of said bottom below said aperture, of a pipe $m$ removably suspended in said aperture and supported by the surrounding part of the bottom $c$, and extending down into said elongation $l$, the upper end of said pipe being flaring to fit the supporting part of the funnel-shaped bottom, a pipe $p$, extending from the surface of the liquor down into the first-mentioned pipe $m$, and a float adapted to hold said pipe $p$ in such position, and another pipe $w$ connected with the said elongation $l$ shortly below the said bottom, as set forth.

In witness whereof I have hereunto set my hand in presence of two witnesses.

VALENTIN LAPP.

Witnesses:
RUDOLPH FRICKE,
CHAS. J. BURT.